United States Patent [19]

Gualillo et al.

[11] 4,102,270
[45] Jul. 25, 1978

[54] DISPOSABLE BOOSTER

[75] Inventors: Silvio P. Gualillo, Baltimore County; Russell L. Hopping, Towson; Ivan E. Tuhy, Baltimore; Charles L. Barker, Dundalk; Herbert H. Buschers, Towson, all of Md.

[73] Assignee: Martin Marietta Corporation, Bethesda, Md.

[21] Appl. No.: 225,174

[22] Filed: May 8, 1951

[51] Int. Cl.² .............................................. F42B 15/10
[52] U.S. Cl. ................................ 102/49.5; 102/49.7; 60/254
[58] Field of Search .............. 60/35.6 R, 254; 102/49, 102/34, 344, 345

[56] References Cited

U.S. PATENT DOCUMENTS

| | | | |
|---|---|---|---|
| 58,646 | 10/1866 | Hunt | 102/49 |
| 2,206,057 | 7/1940 | Skinner | 60/35.6 |
| 2,434,652 | 1/1948 | Hickman | 60/35.6 |
| 2,440,305 | 4/1948 | Skinner | 60/35.6 |
| 2,563,265 | 4/1951 | Parsons | 60/35.6 |

*Primary Examiner*—Samuel Feinberg
*Attorney, Agent, or Firm*—Julian C. Renfro; Martin E. Hogan, Jr.

EXEMPLARY CLAIM

1. A booster comprising an open ended housing, a propellant charge carried within said housing, a trap assembly interposed between said propellant and opening for restraining said propellant, said trap including an annular ring member, and a plurality of radially extending arms held in disengageable interlocking relation with said ring member, said interlocking arms and ring member being arranged to maintain a rigid assembly upon the application of force from one direction, but which are readily collapsible upon the removal of said force after the booster has been expended.

6 Claims, 12 Drawing Figures

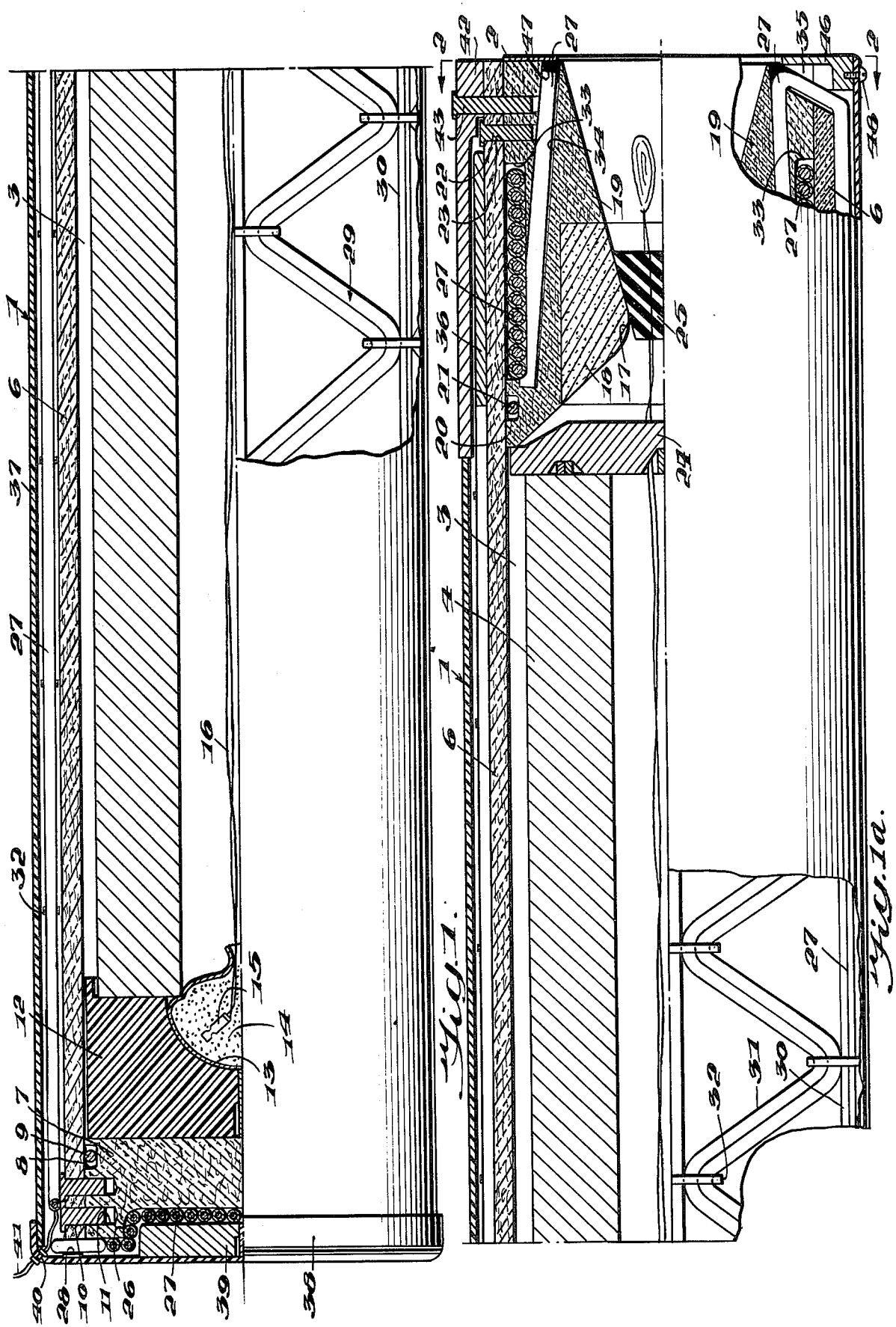

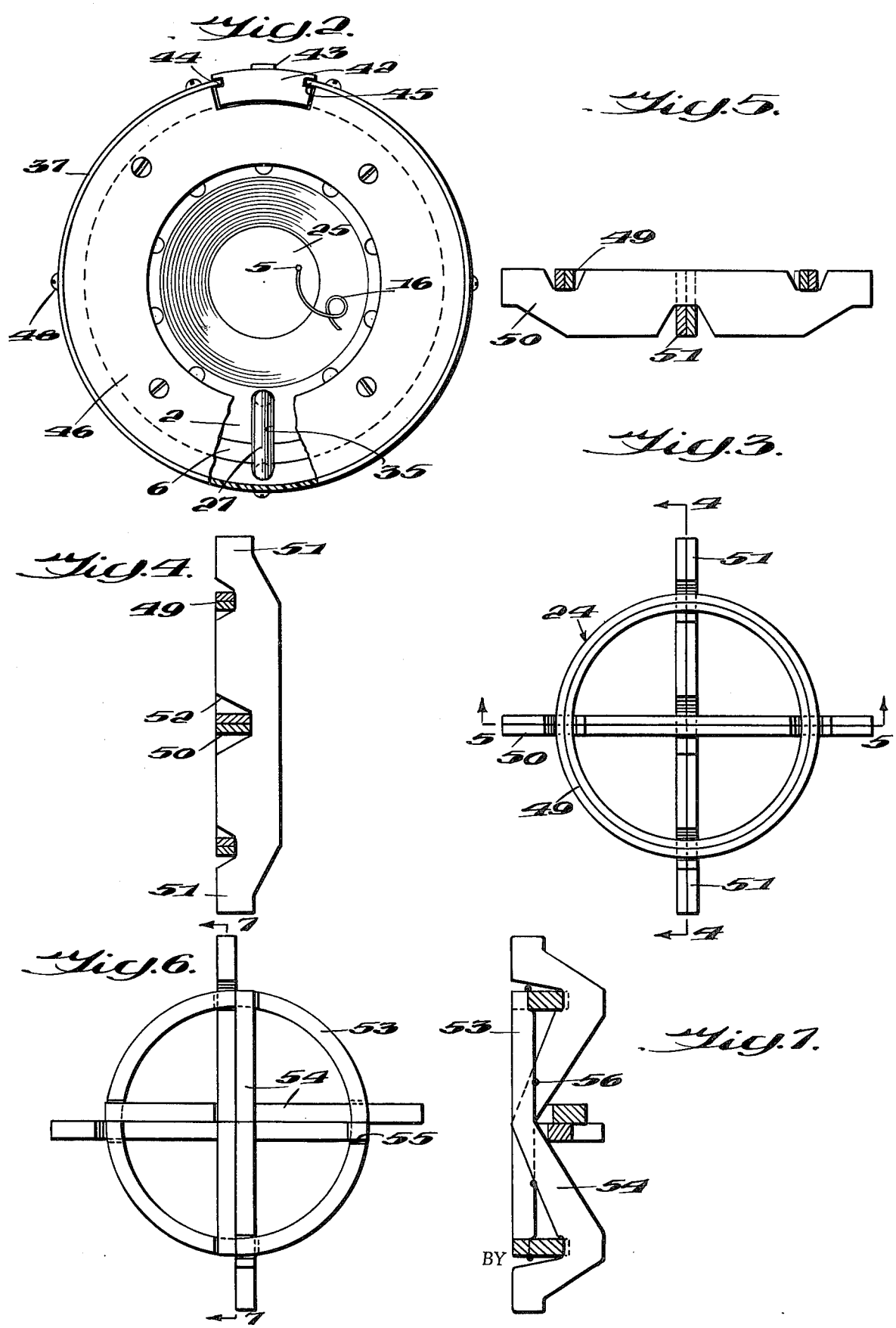

DISPOSABLE BOOSTER

This invention relates to rocket motors of the type used as auxiliary power units on aircraft to supplement the normal power when needed, such as during take-off.

Boosters of the type under consideration employ a solid fuel propellant which is adapted to produce a large amount of thrust for a relatively short period of time. Once the booster is fired and the propellant expended, it can serve no further useful purpose on the aircraft. Therefore, in order to maintain the weight and drag of the aircraft to a minimum and to realize the best performance, the booster is jettisoned therefrom after firing. However, since some of these boosters weigh many hundreds of pounds, allowing them to drop as a unit presents a very serious problem regarding the safety of ground installations and personnel. The only way of eliminating this hazard, using conventional boosters, is to restrict the operation of such aircraft so that the booster will drop over water areas or non-populous localities. Obviously, for defense purposes, such a limitation is a serious disadvantage. It is important that aircraft be able to operate from bases located in and near heavily populated industrial areas so that they may be given protection on short notice.

To eliminate the possibility of causing serious damage upon jettisoning the booster in urban areas, a construction is disclosed herein whereby the booster is fragmented or broken into small pieces after being dropped from the aircraft and before striking the ground. These small pieces scatter over a considerable area, and since the energy level of each is maintained sufficiently low so as to render them substantially "damage free," the dangers inherent in using conventional boosters is eliminated.

It is an object of this invention to provide a disposable booster rocket which will disintegrate into small non-lethal particles after the thrust producing propellant has been expended and the booster jettisoned from the aircraft.

Another object of this invention is to provide a booster rocket which is easily and economically manufactured.

Still another object of this invention is to provide a booster rocket having a trap assembly which is capable of supporting the propellant grain in position within the booster and which is adapted to separate into small non-lethal components after the propellant grain has been expended.

Further and other objects will become apparent from the accompanying description and drawings which form a part of this disclosure and in which like numerals refer to like parts.

In the drawing:

FIG. 1 is a fragmentary sectional side view of the disposable booster of this invention.

FIG. 1a is a continuation of FIG. 1.

FIG. 2 is a fragmentary end view taken on the line 2—2 of FIG. 1.

FIG. 3 is a front view of the disposable trap assembly shown included as a part of the booster in FIG. 1.

FIG. 4 is a view of the trap assembly taken on the line 4—4 of FIG. 3.

FIG. 5 is a view of the trap assembly taken on the line 5—5 of FIG. 3.

Figure 8:
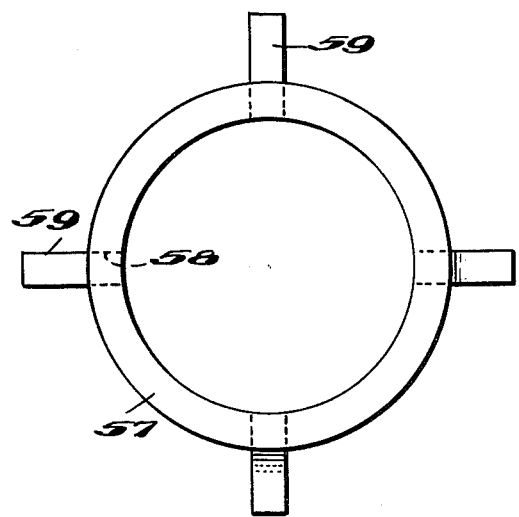

FIGS. 6 and 7, 8 and 9, and 10 and 11 are views showing variations in the construction of the trap assembly shown in FIGS. 3, 4 and 5.

Disposable booster 1 as shown in FIGS. 1 and 2 is a cylindrical unit adapted to develop thrust by the reaction of very hot, expanding gases passing through nozzle 2 in the rearward end of booster 1. A combustion chamber 3 communicating with nozzle 2 is provided for carrying a solid propellant grain charge 4 which generates the expanding gases. Combustion chamber 3 is formed by a tubular member 6 extending substantially throughout the length of the booster. The forward end of tubular member 6 is closed by a transverse head plug 7 having a groove 8 formed circumferentially thereof adapted to carry an O-ring seal 9 for rendering the forward end of the combustion chamber gas-tight. A plurality of pins 10 are inserted in radial bores 11 formed in head plug 7 and tubular member 6 to fix the position of head plug 7 relative to member 6. Pins 10 are held in place by the use of tape. Pins 10 could obviously be secured by other means such as by screw threads, though the specific construction shown is entirely satisfactory and the more economical. A plastic protection spacer 12 abutting head plug 7 within combustion chamber 3 is provided with a recess 13 communicating with combustion chamber 3 into which a bag of igniting powder 14 may be placed for firing propellant grain 4. An electric squib 15 is carried within the bag of igniting powder 14 for causing its ignition. Squib 15 is controlled by an electrical impulse fed through wires 16 extending through combustion chamber 3 and through exhaust nozzle 2.

Tubular member 6 and head plug 7 are made of melamine fiberglass which is capable of resisting the pressures and containing the heat generated by the propellant grain 4 when burning. Other materials having similar properties may obviously be substituted for the melamine fiberglass without departing from the teachings of the instant disclosure. Spacer 12 is primarily employed for supporting the forward end of propellant grain 4 within the chamber. Most any material or structural arrangement for this purpose is satisfactory since it is not adapted to function as a heat insulator.

Exhaust nozzle 2 is secured within tubular member 6 adjacent the rearward end to confine the hot gases produced by the burning of propellant 4 and to realize the maximum thrust output of the booster. The throat portion 17 of nozzle 2 is formed by a graphite insert 18 laminated to nozzle plate 19 of melamine fiberglass so as to withstand the extremely high temperatures and abrasion to which that portion of the nozzle is subjected. A circumferential groove 20 is formed adjacent tubular member 6 in the forward portion of nozzle plate 19 to receive an O-ring 21 for sealing off the combustion chamber 3 except for the opening at throat 17 of nozzle 2. A plurality of pins 22 are received in a plurality of radial bores 23 located around the outer circumference of tubular member 6 to fix the position of nozzle 2 relative to tubular member 6. Pins 22 are held in place by means of tape as are pins 10 at the forward end of the booster.

A trap assembly 24 is interposed between nozzle 2 and propellant charge 4, transversely of the axis of the booster, to support the propellant charge therein so as not to restrict the orifice throat 17 in nozzle 2. Propellant 4 being a tubular shaped mass adapted to burn from the hollow center outwardly rather than from the ends, trap assembly 24 provides support therefor throughout the period of burning.

A rubber stopper 25 is inserted in the orifice throat 17 of nozzle 2 to prevent the combustion chamber and propellant charge from gathering moisture and to help the build up of pressure within the chamber when the propellant grain 4 is initially fired. A small opening 5 in rubber stopper 25 is adapted to receive wires 16 extending into combustion chamber 3. When the pressure within chamber 3 is built up by the burning of igniting powder 14 and propellant charge 4, rubber stopper 25 will thereby be blown rearwardly into the airstream and away from the booster so as not to adversely affect the operation.

A recess 26 is formed in the forward face of head plug 7 to provide space for spirally wrapping detonating cord 27 therein for causing head plug 7 to disintegrate into small non-lethal particles upon igniting the detonating cord. The end of spirally wrapped detonating cord on the forward face of head plug 7 is fed through a notch 28 in tubular member 6 so as to make contact with the detonating cord net work 29 wrapped around the outer wall of the tubular member. Net work 29 consists of six double rows of detonating cord extending the length of tubular member 6 with intermediate loops 31 of detonating cord secured as at 32 to each of the adjacent rows 30. This particular arrangement of wrapping detonating cord around combustion chamber wall 6 is quite effective in disintegrating the melaimine fiberglass material into small harmless particles, though it is to be understood that other arrangements for the same purpose may be employed without departing from the teachings of this invention.

A wide circumferential groove 33 in nozzle 2 provides a recess for winding detonating cord 27 around the nozzle for causing its disintegration after dropping the booster. A plurality of bores 34 extend forwardly in a generally axial direction from the rearward end of the nozzle 2 so as to communicate with groove 33. A narrow groove 35 extending generally radially of the booster is formed in tubular member 6 and nozzle 2 at its rearward end as shown in FIGS. 1 and 2 so as to communicate with one of the plurality of bores 34. One of the ends of the detonating cord in net work 29 is fed through groove 35 and into a bore 34 so as to contact the detonating cord wound around nozzle 2 in groove 33. The remaining bores 34 are filled with short strips of detonating cord 27 which also contact the detonating cord wound around nozzle 2 in recess 33. A sealing compound 47 is used to plug the openings in bores 34 after inserting the strips of detonating cord.

A time delay detonator 36 is carried adjacent the rearward end of booster 1 as shown in FIG. 1 and held in contiguous relationship with the detonating cord 27 in net work 29. By firing detonator 36, at the end of the predetermined time delay the detonating cord is exploded causing disintegration of the booster components into non-lethal particles which may safely drop to the ground. Detonating cord being an explosive powder wrapped with a fiberous material to form the cord, its reaction after being detonated is almost instantaneous. Therefore, by having the various windings of detonating cord contacting one another, the action of the one time delay detonator 36 serves to detonate all the detonating cord substantially simultaneously.

A tubular housing 37 is telescoped over the combustion chamber assembly and detonating cord net work 29 so as to protect the cords from possible damage. A cap 38 is secured to the forward end of tubular housing 37 to protect the detonating cord 27 spirally wound in recess 26 on the forward face of head plug 7. A spacer-like element 39 is carried between cap 38 and spirally wound detonating cord 27 so as to hold the cord in place within the recess. A small opening 40 is provided in cap 38 through which wires 41 connecting with time delay detonator 36 are fed for controlling its actuation. Sliding detonator cover 42 is provided immediately over time delay detonator 36 and is held in closed position by means of pin 43 extending into tubular member 6 and nozzle 2. Grooves 44 in detonator cover 42 engage wall edges 45 on housing 37 as shown in FIG. 2. This construction of the detonator cover permits it to be slid rearwardly relative to tubular housing 37 to gain access to time delay detonator 36. An annular end plate 46 is secured to the rearward exhaust end of booster 1 to support the rearward end of housing 37 and to strengthen the exhaust end of the booster.

Trap assembly 24 shown as a part of booster 2 in FIG. 1 must withstand very high temperatures and considerable force, necessitating the use of durable materials such as steel alloys. Due to the high temperatures in the combustion chamber, it is not possible to cause its disintegration in the same manner employed for the other components of the booster. Detonation of detonating cord in this area could not be controlled, and even if it could, it would not be effective against high strength steel alloys. Therefore, trap assembly 24 is made up of a plurality of pieces which are adapted to maintain a fixed position relative to one another when forces are acting upon it in one direction and to fall apart upon removal of those forces. The trap assembly, shown in FIGS. 3, 4 and 5, is composed of a laminated ring 49 supported on two inter-locking laminated cross arms 50 and 51, the ends of which rest against nozzle 2. Laminated ring 49 includes two concentric rings fitting loosely one inside the other. Cross arms 50 and 51 each include two segments laminated together in side by side relationship. Notches 52 are cut in cross arms 50 and 51 for seating laminated ring 49 and for interlocking the cross arms at their intersection with one another. Laminated ring 49 is adapted to seat against the end of propellant 4 and distribute the supporting load uniformly so as to prevent local failures in the propellant. These elements 49, 50 and 51 of the trap assembly are temporarily secured together with a bonding material such as soft solder, Wood's metal, or shellac which is adapted to melt and burn or otherwise be removed during burning of the propellant 4. As is obvious from the drawing, forces acting against the trap assembly from within the combustion chamber, will be resisted and upon removal of those forces after the application of heat sufficient to destroy the temporary bond, the components separate into small non-lethal parts having a low energy level.

FIGS. 6 and 7 illustrate a variation in the trap assembly construction wherein a ring 53 and four arms 54 are arranged to function in the manner described for the trap assembly shown in FIGS. 3, 4 and 5. Here, ring 53 is notched as at 55 to seat the ends of arms 54. The other ends of arms 54 are adapted to rest on the opposite side of ring 53 and project therebeyond so as to rest against nozzle 2. These components are likewise temporarily secured together as at 56 such as by a low melting point material so that it may be more easily installed in the booster.

Figure 9:
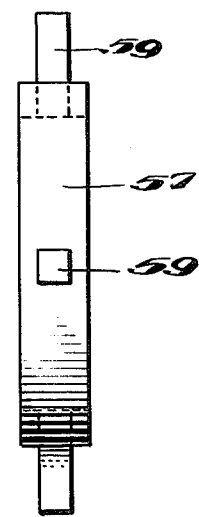

FIGS. 8 and 9 illustrate another variation in trap assembly construction wherein ring 57 is provided with radial bores 58 into which pins 59 may be loosely inserted so that they will disengage with ring 57 when the combustion chamber housing of the booster disintegrates.

Figure 10:
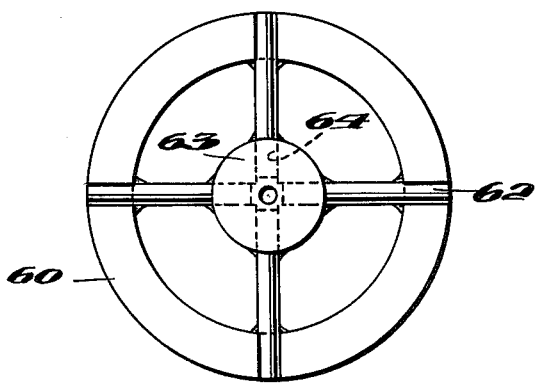
Figure 11:
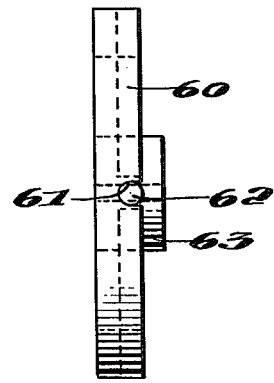

Still another variation by way of illustration in the construction of the disposable trap assembly is shown in FIGS. 10 and 11. A ring 60 is provided with radial notches 61 adapted to receive pins 62 for supporting the propellant grain within the booster. A hub 63 adapted for suspended support within the booster carries pins 62 which project into bores 64. The individual components of this trap assembly are also adapted to be temporarily bonded together to prevent it from falling apart when being installed in the booster.

Propellant charge 4 in booster 1 is initially fired by an electrical impulse fed through wires 16 for igniting the electric squib 15 carried within powder 14. The ignition of the squib initiates ignitor powder 14 which produces sufficient heat to start the burning of propellant charge 4. The heat insulating melamine fiberglass material forming the combustion chamber isolates the heat of the burning propellant so as to prevent uncontrolled detonation of detonating cord 27. The burning of the propellant charge is very rapid, causing pressure within the combustion chamber 3 to build up substantially instantaneously and blow stopper 25 from the throat 17 of nozzle 2. The hot gases generated by the propellant grain 4 pass through nozzle 2 to produce the power or thrust for assisting the aircraft to which it is attached. The heat of the gases melts the temporary bonding material in trap assembly 24 and blows it into the airstream through nozzle 2. When propellant grain 4 has completed its burning and as the booster is dropped from the aircraft, an electrical impulse through wires 41 initiates operation of the time delay detonator 36. When detonator 36 has been in operation for a predetermined period of time, it is caused to detonate detonating cord 27. The explosive action caused by burning of the detonating cord occurs substantially simultaneously to cause the components of the booster to disintegrate into relatively small particles which fall harmlessly earthward. The detonating cord carried in nozzle 2 and head plug 7, being in contact with net work 29 around the outer wall of tubular member 6, is effectively an integral part of the network controlled by the detonator and therefore explodes with it. As combustion chamber housing 6 disintegrates, the laminated strips and rings of trap assembly 24 fall apart into harmless components which may be safely dropped.

The disposable booster described herein may be used as a power unit on missiles and other aircraft which are launched from inland stations without the hazards accompanying such launching with the use of conventional boosters.

It is to be understood that certain changes, alterations, modifications and substitutions can be made without departing from the spirit and scope of the appended claims.

We claim as our invention:

1. A booster comprising an open ended housing, a propellant charge carried within said housing, a trap assembly interposed between said propellant and opening for restraining said propellant, said trap including an annular ring member, and a plurality of radially extending arms held in disengageable interlocking relation with said ring member, said interlocking arms and ring member being arranged to maintain a rigid assembly upon the application of force from one direction, but which are readily collapsible upon the removal of said force after the booster has been expended.

2. A disposable rocket motor comprising, a generally tubular housing forming a combustion chamber, an exhaust nozzle rigidly connecting with said housing at one end thereof, said nozzle having an orifice formed therein communicating with said combustion chamber, a propellant charge carried within said combustion chamber adapted to generate gas for exhausting through said nozzle, a network of detonating cord surrounding said housing, a detonator adapted to detonate said detonating cord and thereby destroy said housing whereby said motor is caused to disintegrate.

3. A booster comprising a generally tubular housing, one end of said housing having an opening formed therein, a propellant charge carried within said housing, a trap assembly transversely carried within said housing between said opening and said propellant, said trap including an annular ring member seating against said propellant charge to retain said charge in place in said housing, and a plurality of radial arms extending from said ring member to engage said housing, said arms being disengageably interlocked with said ring member to provide a stable assembly while supported by said propellant charge and thereafter to collapse into its component parts upon said propellant charge being expended.

4. A disposable booster adapted to be dropped from an aircraft and rendered harmless upon striking the earth comprising an open ended housing of heat insulating material, a propellant charge carried within said housing, a trap assembly interposed between said propellant and said opening for restraining said propellant, said trap including an annular ring member, and a plurality of radially extending arms interlocking with said ring member to provide a stable assembly only to forces acting axially thereof in one direction by said propellant, explosive means carried within said housing and isolated from said propellant for causing said booster to disintegrate upon detonation, and detonating means for detonating said explosive means.

5. A disposable rocket motor comprising a housing of heat insulating material forming a combustion chamber, a nozzle carried by said housing at one end thereof and having an opening into said combustion chamber, means associated therewith adapted to generate gas for passage through said orifice whereby thrust is produced, explosive means carried within said motor and arranged in a network surrounding said combustion chamber and isolated therefrom for causing said motor to disintegrate upon detonation, and a detonator for detonating said explosive means.

6. A disposable rocket motor comprising a generally tubular housing forming a combustion chamber, an exhaust nozzle rigidly connecting with said housing at one end thereof, said nozzle having an orifice formed therein communicating with said combustion chamber, a propellant charge carried within said combustion chamber adapted to generate gas for exhausting through said nozzle, a network of detonating cord surrounding said housing, a detonator adapted to detonate said detonating cord and thereby destroy said housing whereby said motor is caused to disintegrate, a retainer trap assembly in said chamber between said propellant charge and said nozzle, said trap assembly including an annular ring member and a plurality of radially extending arms held in disengageable interlocking relation with said ring member, said interlocking arms and ring member being arranged to maintain a rigid assembly upon the application of force from one direction, but which readily collapses upon the removal of said force after the motor has been expended.

* * * * *